US009989775B2

(12) United States Patent  
Crowder et al.

(10) Patent No.: US 9,989,775 B2  
(45) Date of Patent: Jun. 5, 2018

(54) DUAL-SIDED PEPPER'S GHOST ILLUSION

(71) Applicant: VENTANA 3D, LLC, Van Nuys, CA (US)

(72) Inventors: Ashley Crowder, Venice, CA (US); Benjamin Conway, Santa Monica, CA (US); Troy P. Senkiewicz, Toluca Lake, CA (US)

(73) Assignee: VENTANA 3D, LLC, Van Nuys, CA (US)

( * ) Notice: Subject to any disclaimer, the term of this patent is extended or adjusted under 35 U.S.C. 154(b) by 53 days.

(21) Appl. No.: 15/064,924

(22) Filed: Mar. 9, 2016

(65) Prior Publication Data

US 2016/0266396 A1 Sep. 15, 2016

Related U.S. Application Data

(60) Provisional application No. 62/129,989, filed on Mar. 9, 2015.

(51) Int. Cl.  
*G02B 27/22* (2018.01)

(52) U.S. Cl.  
CPC .............................. *G02B 27/2292* (2013.01)

(58) Field of Classification Search  
CPC . G02B 27/22; G02B 5/32; G03B 21/00; A63J 13/00; H04N 13/04; H04N 5/74  
See application file for complete search history.

(56) References Cited

U.S. PATENT DOCUMENTS

| | | | | |
|---|---|---|---|---|
| 6,481,851 B1* | 11/2002 | McNelley | .......... | G02B 27/2292 345/5 |
| 2002/0098419 A1* | 7/2002 | Takada | .................. | G02B 5/32 430/1 |
| 2006/0181769 A1* | 8/2006 | Kumasawa | .......... | G03B 21/604 359/449 |
| 2009/0323145 A1* | 12/2009 | Kim | .................. | G02B 5/32 359/25 |

FOREIGN PATENT DOCUMENTS

JP          2004163528 A    *    6/2004

* cited by examiner

*Primary Examiner* — Sultan Chowdhury  
*Assistant Examiner* — Danell L Owens  
(74) *Attorney, Agent, or Firm* — Parker Ibrahim & Berg LLP; James M. Behmke; Stephen D. LeBarron

(57) ABSTRACT

Systems and methods herein are directed to a dual-sided Pepper's Ghost Illusion is shown and described. In particular, various embodiments are described that allow using multiple image sources (e.g., projected bounces and/or panel displays) so the holographic image can be seen from both sides of the holographic system. In one embodiment, a specifically designed "Z frame" may be used to minimize the visible components in such a dual-sided system (e.g., particularly for smaller displays).

20 Claims, 14 Drawing Sheets

BOUNCE ON CEILING

DUAL-SIDED PEPPER'S GHOST ILLUSION

RELATED APPLICATION

This application claims priority to U.S. Provisional Application No. 62/129,989 filed on Mar. 9, 2015 entitled DUAL-SIDED PEPPER'S GHOST ILLUSION, by Crowder, et al., the contents of which are incorporated herein by reference.

TECHNICAL FIELD

The present disclosure relates generally to holographic projection, and, more particularly, to a dual-sided Pepper's Ghost Illusion.

BACKGROUND

The "Pepper's Ghost Illusion" is an illusion technique known for centuries (named after John Henry Pepper, who popularized the effect), and has historically been used in theatre, haunted houses, dark rides, and magic tricks. It uses plate glass, Plexiglas, or plastic film and special lighting techniques to make objects seem to appear or disappear, become transparent, or to make one object morph into another. Traditionally, for the illusion to work, the viewer must be able to see into a main room, but not into a hidden room. The hidden room may be painted black with only light-colored objects in it. When light is cast on the room, only the light objects reflect the light and appear as ghostly translucent images superimposed in the visible room.

Notably, Pepper's Ghost Illusion systems have generally remained the same since the 19th Century, adding little more over time than the use of projection systems that either direct or reflect light beams onto the transparent angled screen, rather than using live actors in a hidden room. That is, technologies have emerged in the field of holographic projection that essentially mimic the Pepper's Ghost Illusion, using projectors as the light source to send a picture of an object or person with an all-black background onto a flat, high-gain reflection surface (also referred to as a "bounce"), such as white or grey projection screen. The bounce is typically maintained at an approximate 45-degree angle to the transparent screen surface.

For example, a recent trend in live music performances has been to use a holographic projection of a performer (e.g., live-streamed, pre-recorded, or re-constructed). FIG. 1 illustrates an example of a conventional (generally large-scale) holographic projection system 100. Particularly, the streamed (or recorded, or generated) image of the artist (or other object) may be projected onto a reflective surface, such that it appears on an angled screen and the audience sees the artist or object and not the screen. If the screen is transparent, this allows for other objects, such as other live artists, to stand in the background of the screen, and to appear to be standing next to the holographic projection when viewed from the audience.

Still, despite its historic roots, holographic projection technology is an emerging field, particularly with regards to various aspects of enhancing the illusion and/or managing the setup of the system.

SUMMARY

According to one or more embodiments herein, a dual-sided Pepper's Ghost Illusion is shown and described. In particular, various embodiments are described that allow using multiple image sources (e.g., projected bounces and/or panel displays) so the holographic image can be seen from both sides of the holographic system. In one embodiment, a specifically designed "Z frame" may be used to minimize the visible components in such a dual-sided system (e.g., particularly for smaller displays).

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
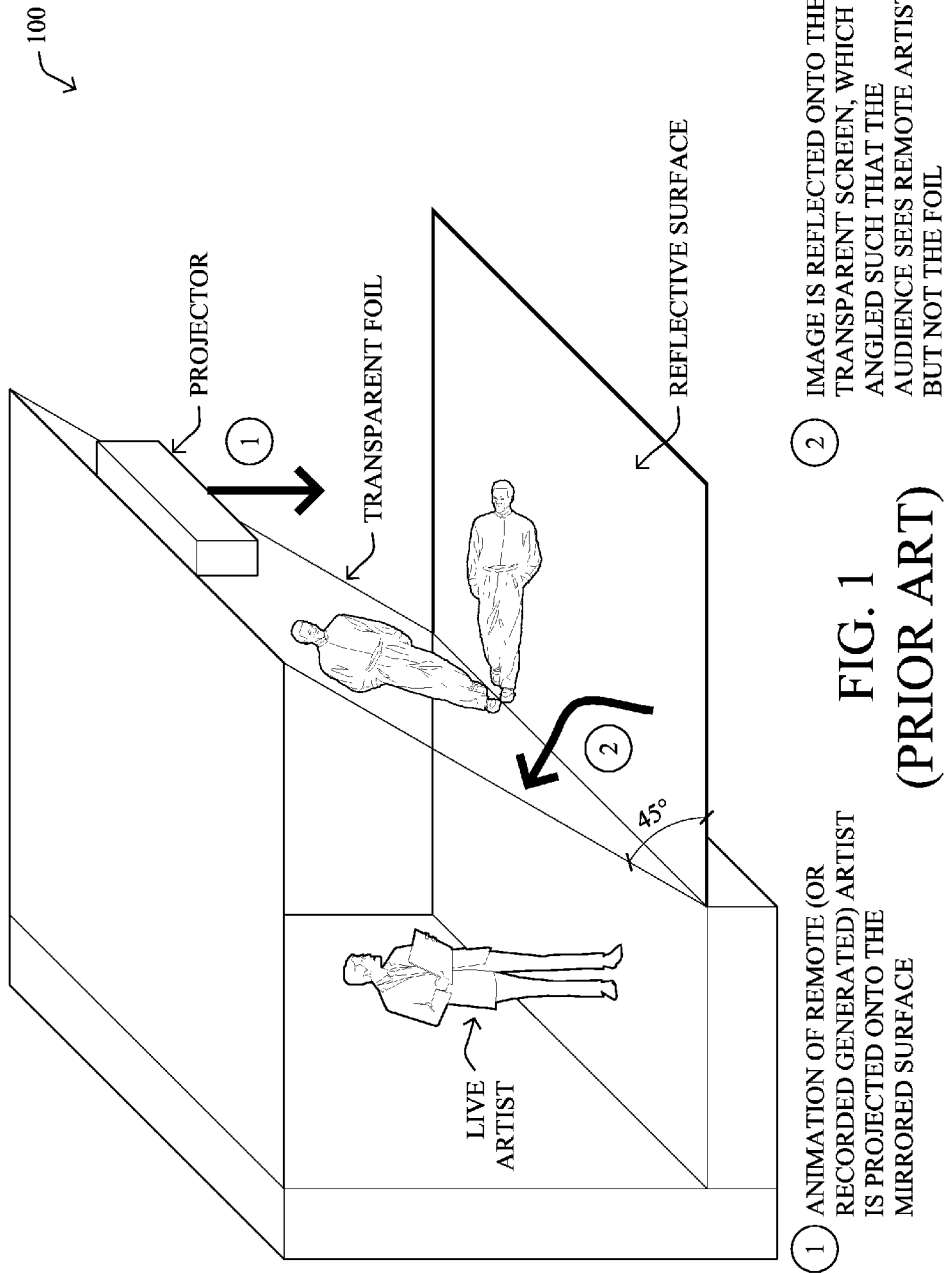
FIG. 1 illustrates an example of well-known holographic projection techniques.

As noted above, the "Pepper's Ghost Illusion" is an illusion technique that uses plate glass, Plexiglas, or plastic film and special lighting techniques to make holographic projections of people or objects. FIG. 1, in particular, illustrates an example of holographic projection using projectors as the light source to send a picture of an object or person with an all-black background onto a flat, high-gain reflection surface (or "bounce"), such as white or grey projection screen. The bounce is typically maintained at an approximate 45-degree angle to the transparent screen surface.

Figure 2:
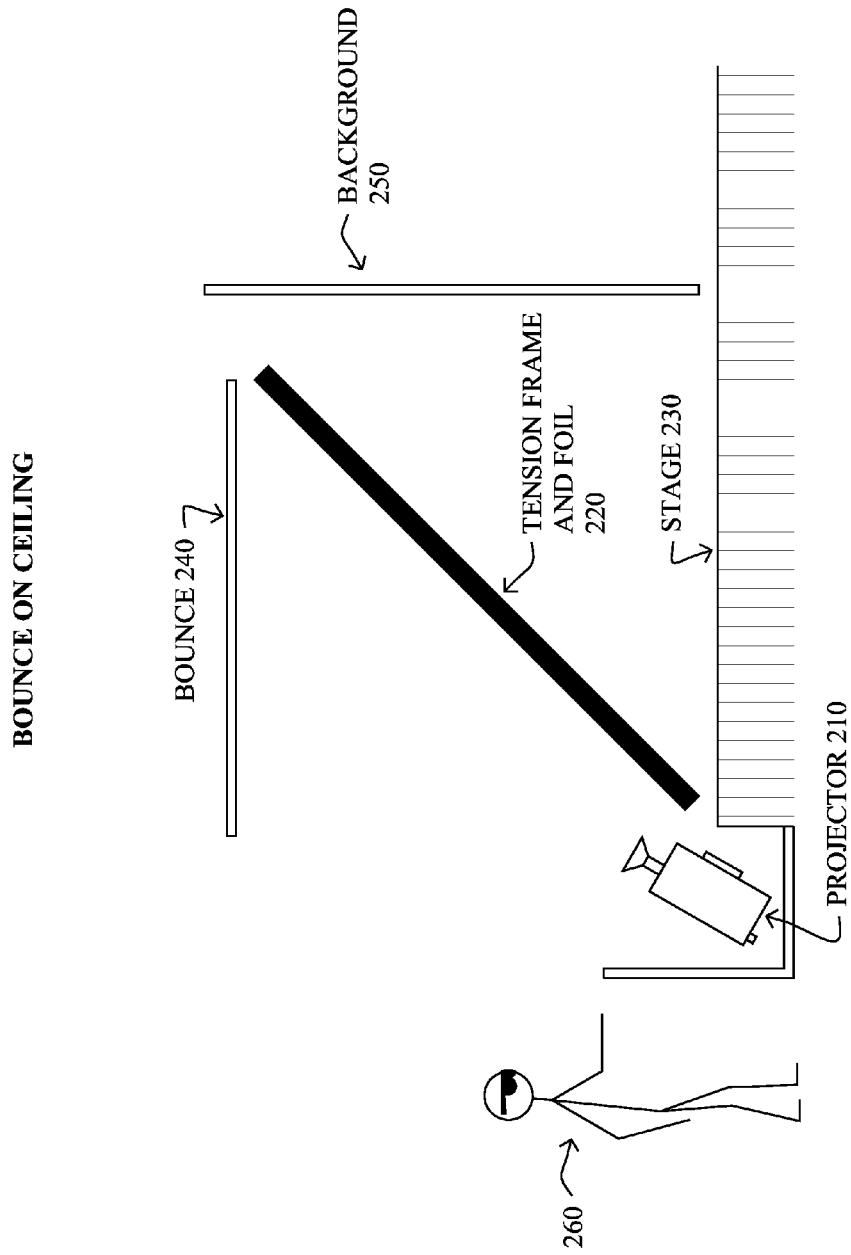
FIG. 2 illustrates an alternative arrangement for a projection-based holographic projection system, namely where the projector is located on the floor, and the bounce is located on the ceiling.

FIG. 2 illustrates an alternative arrangement for a projection-based holographic projection system, namely where the projector 210 is located on the floor, and the bounce 240 is located on the ceiling. The stick figure illustrates the viewer 260, that is, from which side one can see the holographic projection. In this arrangement, the same effect can be achieved as in FIG. 1, though there are various considerations as to whether to use a particular location of the projector 210 as in FIG. 1 or FIG. 2.

Though the projection-based system is suitable in many situations, particularly large-scale uses, there are certain issues with using projectors in this manner. For example, if atmosphere (e.g., smoke from a fog machine) is released, the viewer 260 can see where the light is coming from, thus ruining the effect. Also, projectors are not typically bright enough to shine through atmosphere, which causes the reflected image to look dull and ghost-like. Moreover, projectors are large and heavy which leads to increased space requirements and difficulty rigging.

Figure 3:
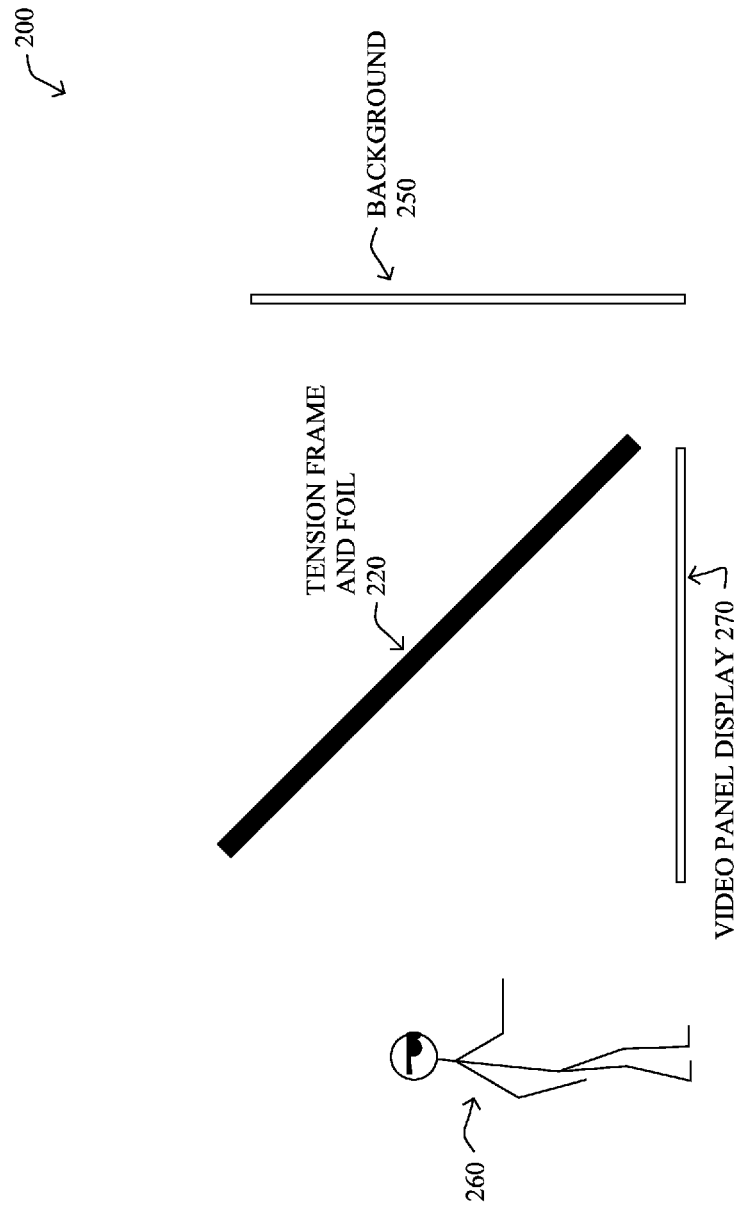
FIG. 3 illustrates an example of a holographic projection system using video panel displays, with the panel below a transparent screen.
Figure 4:
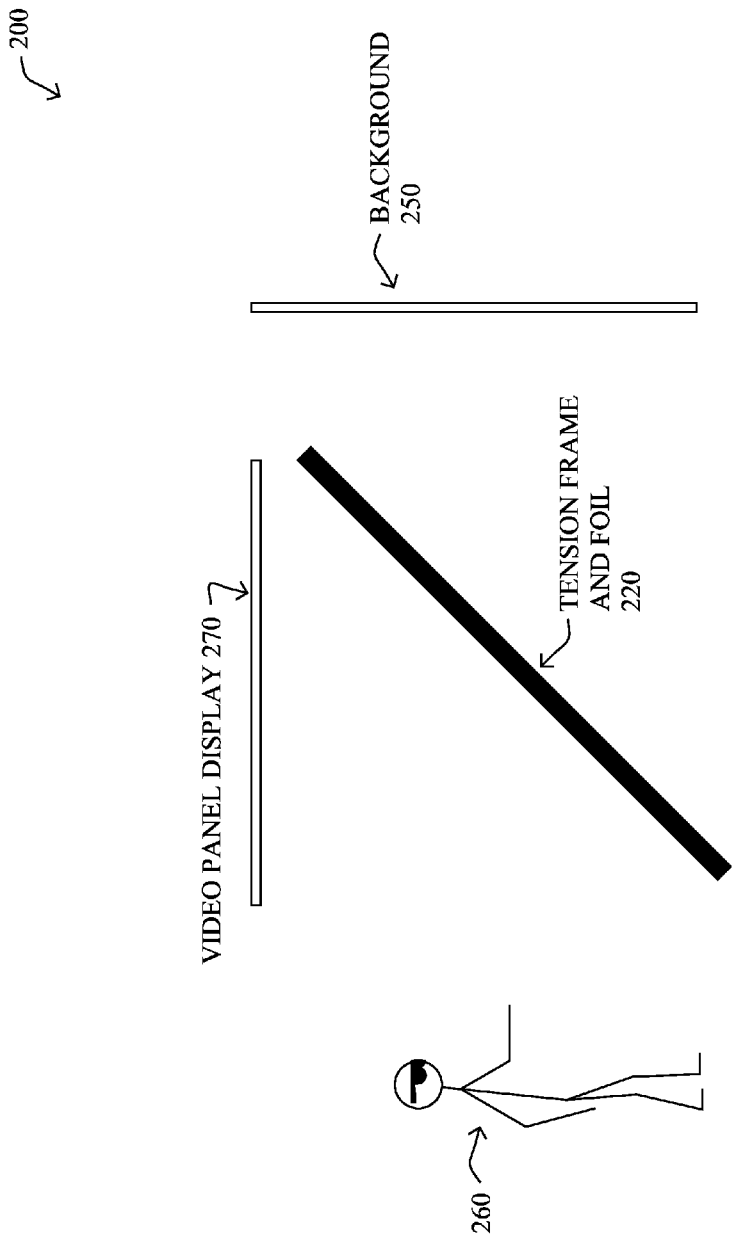
FIG. 4 illustrates an example of a holographic projection system using video panel displays, with the panel above a transparent screen.

Another example holographic projection system, therefore, with reference generally to FIGS. 3 and 4, may be established with video panel displays 270, such as LED or LCD panels, mobile phones, tablets, laptops, or monitors as the light source, rather than a projection-based system. In particular, these panel-based systems allow for holographic projection for any size setup, such as from personal "mini" displays (e.g., phones, tablets, etc.) up to the larger full-stage-size displays (e.g., with custom-sized LCD or LED panels). Similar to the typical arrangement, a preferred angle between the image light source and the reflective yet transparent surface (clear screen) is an approximate 45-degree angle, whether the display is placed below the transparent screen (FIG. 3) or above it (FIG. 4).

Again, the stick figure illustrates the viewer 260, that is, from which side one can see the holographic projection. Note that the system typically provides about 165-degrees of viewing angle. (Also note that various dressings and props can be designed to hide various hardware components and/or to build an overall scene, but such items are omitted for clarity.)

The transparent screen is generally a flat surface that has similar light properties of clear glass (e.g., glass, plastic such as Plexiglas or tensioned plastic film). As shown, a tensioning frame 220 is used to stretch a clear foil into a stable, wrinkle-free (e.g., and vibration resistant) reflectively transparent surface (that is, displaying/reflecting light images for the holographic projection, but allowing the viewer to see through to the background). Generally, for larger displays it may be easier to use a tensioned plastic film as the reflection surface because glass or rigid plastic (e.g., Plexiglas) is difficult to transport and rig safely.

The light source itself can be any suitable video display panel, such as a plasma screen, an LED wall, an LCD screen, a monitor, a TV, a tablet, a mobile phone, etc. A variety of sizes can be used. When an image (e.g., stationary or moving) is shown on the video panel display 270, such as a person or object within an otherwise black (or other stable dark color) background, that image is then reflected onto the transparent screen (e.g., tensioned foil or otherwise), appearing to the viewer (shown as the stick figure) in a manner according to Pepper's Ghost Illusion. However, different from the original Pepper's Ghost Illusions using live actors/objects, and different from projector-based holographic systems, the use of video panel displays reduces or eliminates the "light beam" effect through atmosphere (e.g., fog), allowing for a clearer and un-tainted visual effect of the holographic projection. (Note that various diffusion layers may be used to reduce visual effects created by using video panel displays, such as the Moiré effect.) Also, using a video panel display 270 may help hide projector apparatus, and may reduce the overall size of the holographic system.

Additionally, some video panels such as LED walls are able to generate a much brighter image than projectors are able to generate thus allowing the Pepper's Ghost Illusion to remain effective even in bright lighting conditions (which generally degrade the image quality). The brighter image generated from an LED wall also allows for objects behind the foil to be more well lit than they can be when using projection.

In addition, by displaying an image of an object or person with a black background on the light source, it is reflected onto the transparent flat surface so it looks like the object or person is floating or standing on its own. In accordance with typical Pepper's Ghost Illusion techniques, a stage or background can be put behind and/or in front of the transparent film so it looks like the object or person is standing on the stage, and other objects or even people can also be on either side of the transparent film.

In certain embodiments, to alleviate the large space requirement in setting up a Pepper's Ghost display (e.g., to display a realistic holographic projection, a large amount of depth is typically needed behind the transparent screen), an optical illusion background may be placed behind the transparent screen in order to create the illusion of depth behind the screen (producing a depth perception or "perspective" that gives a greater appearance of depth or distance behind a holographic projection).

In general, holographic projections may be used for a variety of reasons, such as entertainment, demonstration, retail, advertising, visualization, video special effects, and so on. The holographic images may be produced by computers that are local to the projectors or video panels, or else may be generated remotely and streamed or otherwise forwarded to local computers.

As an example, by streaming the video image of the performer as a video and projecting it onto a holographic projection system, a true concert or nightclub experience can be transmitted across the globe for the live entertainment experience. For instance, holographically live-streaming concerts to satellite venues around the globe while maintaining the live concert experience helps artists reach new markets and new revenue streams, while bringing live sets to more fans all across the world. Satellite venues can be configured to have the same concert feel as an actual show: intense lighting effects, great sound quality, bars, merchandise, etc. The only difference is that the performers are not physically present, but are holographically projected from the broadcast venue. The music is streamed directly from the soundboard of the broadcast venue and sent to state-of-the-art sound systems at the satellite venues. Light shows may accompany the performance with top of the line LED screens and lasers.

Figure 5:
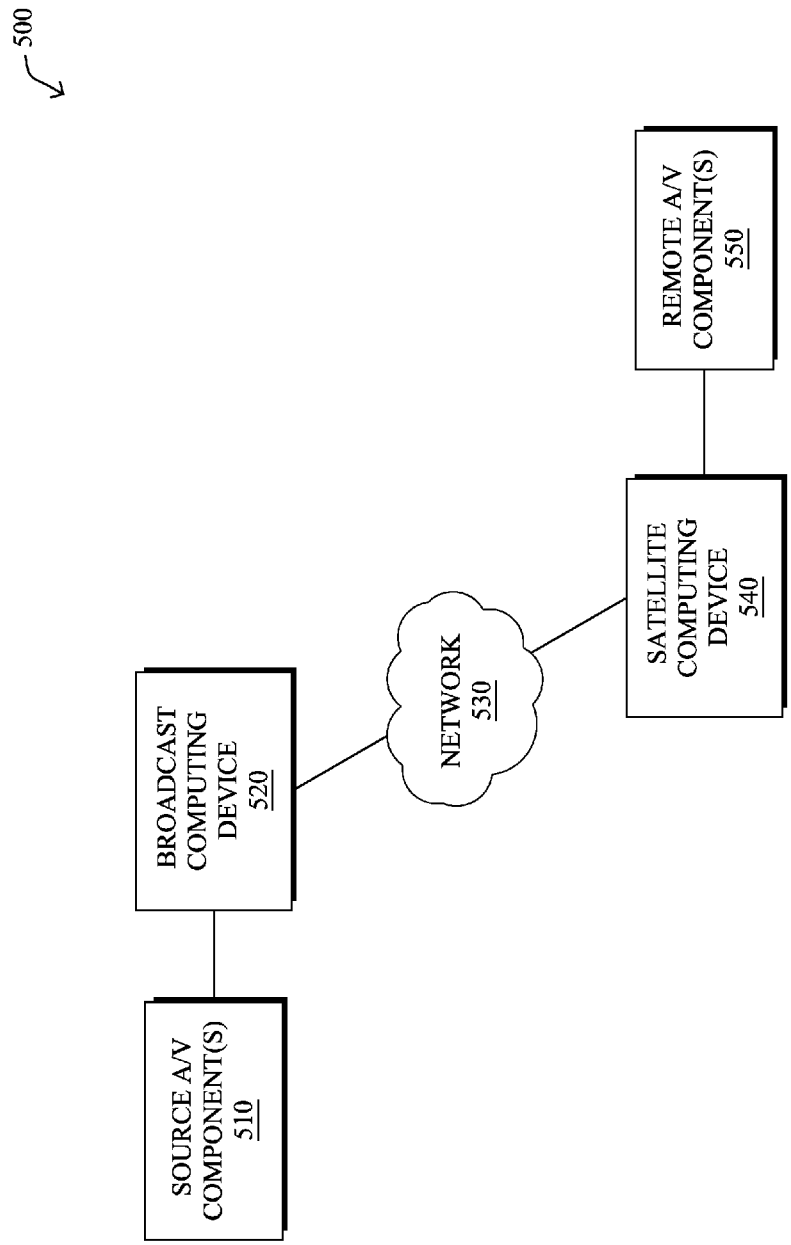
FIG. 5 illustrates an example simplified holographic projection system (e.g., communication network)

For instance, FIG. 5 illustrates an example simplified holographic projection system (e.g., communication network), where the network 500 comprises one or more source A/V components 510, one or more "broadcast" computing devices 520 (e.g., a local computing device), a communication network 530 (e.g., the public Internet or other communication medium, such as private networks), one or more "satellite" computing devices 540 (e.g., a remote computing device), and one or more remote A/V components 550.

In the example above, a broadcast venue may comprise the source A/V components 510, such as where a performance artist is performing (e.g., where a disc jockey (DJ) is spinning) in person. The techniques herein may then be used to stream (relay, transmit, re-broadcast, etc.) the audio and video from this broadcast location to a satellite venue, where the remote A/V components 550 are located. For instance, the DJ in the broadcast location may have the associated audio, video, and even corresponding electronic effects (lights, pyrotechnics, etc.) streamed directly to the satellite venue's A/V system with the same high quality sound as if the musician/artist was playing/singing in person.

As another example, in computing, an "avatar" is the graphical representation of the user (or the user's alter ego or other character). Avatars may generally take either a two-dimensional (2D) form or three-dimensional (3D) form, and typically have been used as animated characters in computer games or other virtual worlds (e.g., in addition to merely static images representing a user in an Internet forum). To control an avatar or other computer-animated model (where, notably, the term "avatar" is used herein to represent humanoid and non-humanoid computer-animated objects that may be controlled by a user), a user input system converts user action into avatar movement.

Figure 6:
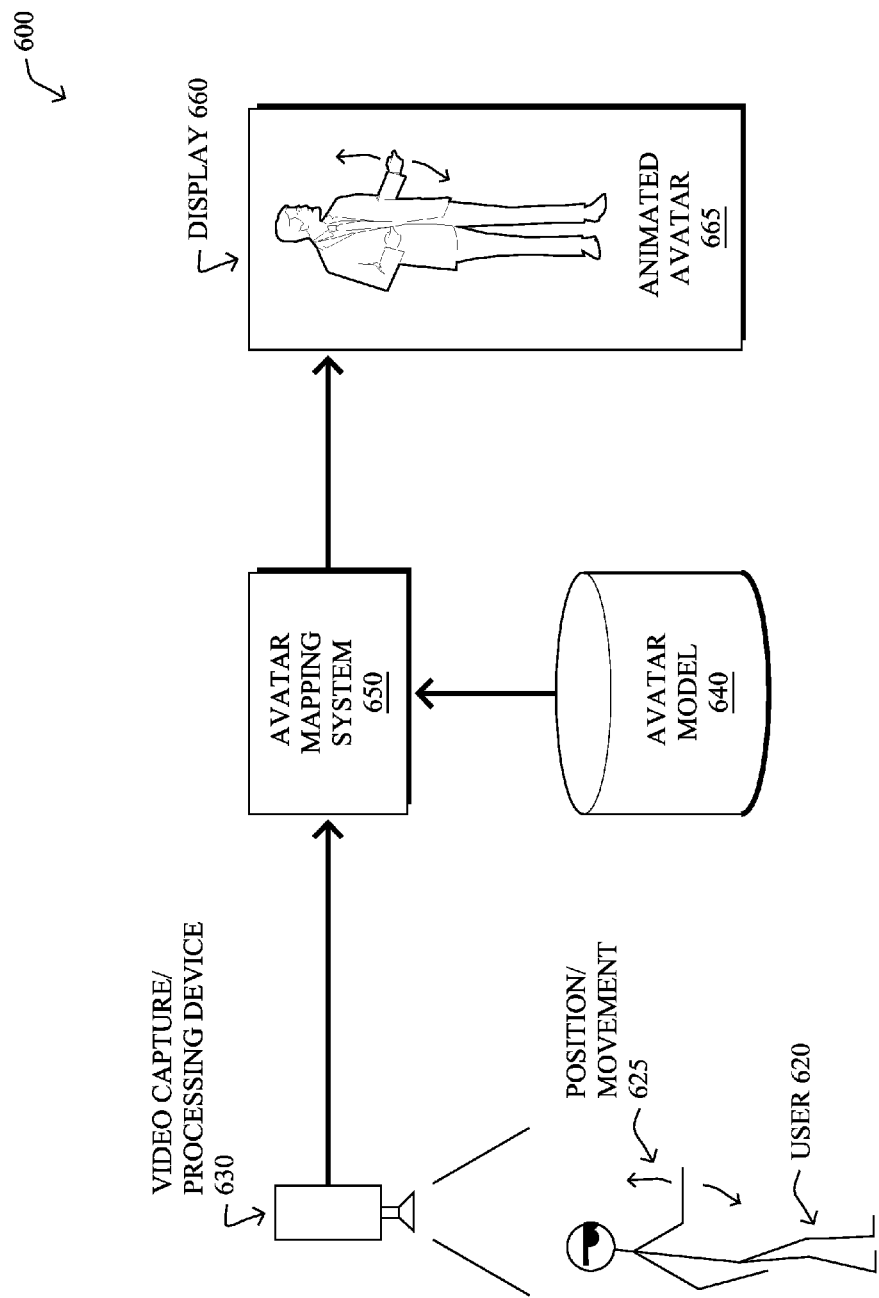
FIG. 6 illustrates a simplified example of an avatar control system.

FIG. 6 illustrates a simplified example of an avatar control system. In particular, as shown in the system 600, a video capture/processing device 610 is configured to capture video images of one or more objects, particularly including one or more users 620 that may have an associated position and/or movement 625. The captured video data may comprise color information, position/location information (e.g., depth information), which can be processed by various body tracking and/or skeletal tracking algorithms to detect the locations of various tracking points (e.g., bones, joints, etc.) of the user 620. An avatar mapping system 650 may be populated with an avatar model 640, such that through various mapping algorithms, the avatar mapping system is able to animate an avatar 665 on a display 660 as controlled by the user 620. Illustratively, in accordance with the techniques herein the display 660 may comprise a holographic projection of the model animated avatar 665, e.g., allowing an individual to interactively control a holographic projection of a character. (Notably, the avatar mapping system 650 may provide its control functionality in real-time or as a recorded/post-production video feed, and may be co-located with the video processing system 630, remotely located from the video processing system, or as divided components allowing it to be both local to and remote from the video processing system.)

Dual-Sided Pepper's Ghost Illusion

As mentioned above, a dual-sided Pepper's Ghost Illusion allows using multiple image sources (e.g., projected bounces and/or panel displays) so the holographic image can be seen from both sides of the holographic system. In particular, this arrangement is useful for larger viewing audience angles as well as for holographic interaction, such as for stage performers, avatar interaction, etc., as described below.

FIGS. 7-11 illustrate various examples of the hologram projection system setup in accordance with one or more embodiments of the present invention. Note that for each embodiment described below, there are generally two image sources, and one holographic screen. However, it is expressly contemplated that any number of light sources and holographic foils may be used. Also, while the below examples demonstrate using the same type of image source on both sides of the system (e.g., two display panels, two projectors, etc.), the techniques herein may also mix image sources (e.g., one display panel and one projector). Moreover, each image source should be at an approximate 45-degree angle to the holographic screen (e.g., tensioned foil, glass, or other wrinkle free plastic, as described above), though other lighting techniques may be used to allow other angles, accordingly. Note that various dressing and props can be designed to hide the hardware and to better fit the scene in any system below, as well.

Figure 7:
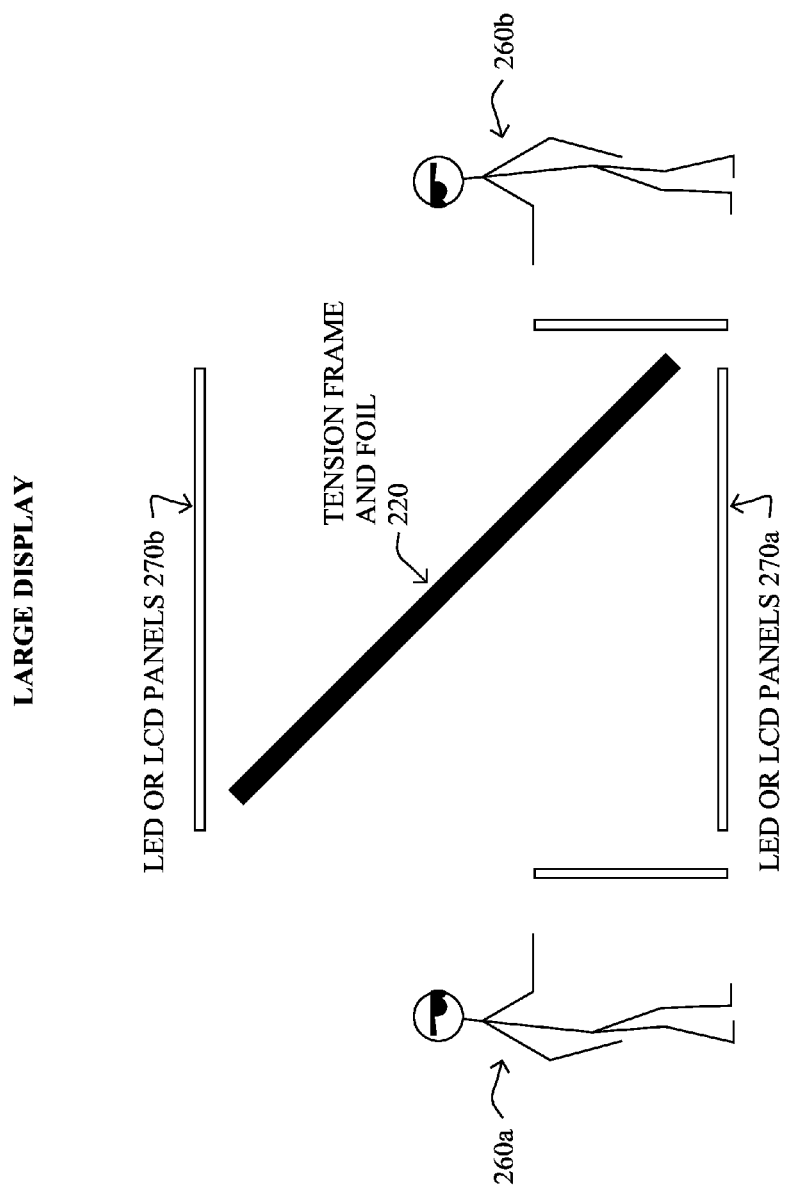
FIG. 7 illustrates an example dual-sided holographic image system using panel displays on the floor and ceiling in accordance with one or more embodiments described herein.
Figure 8:
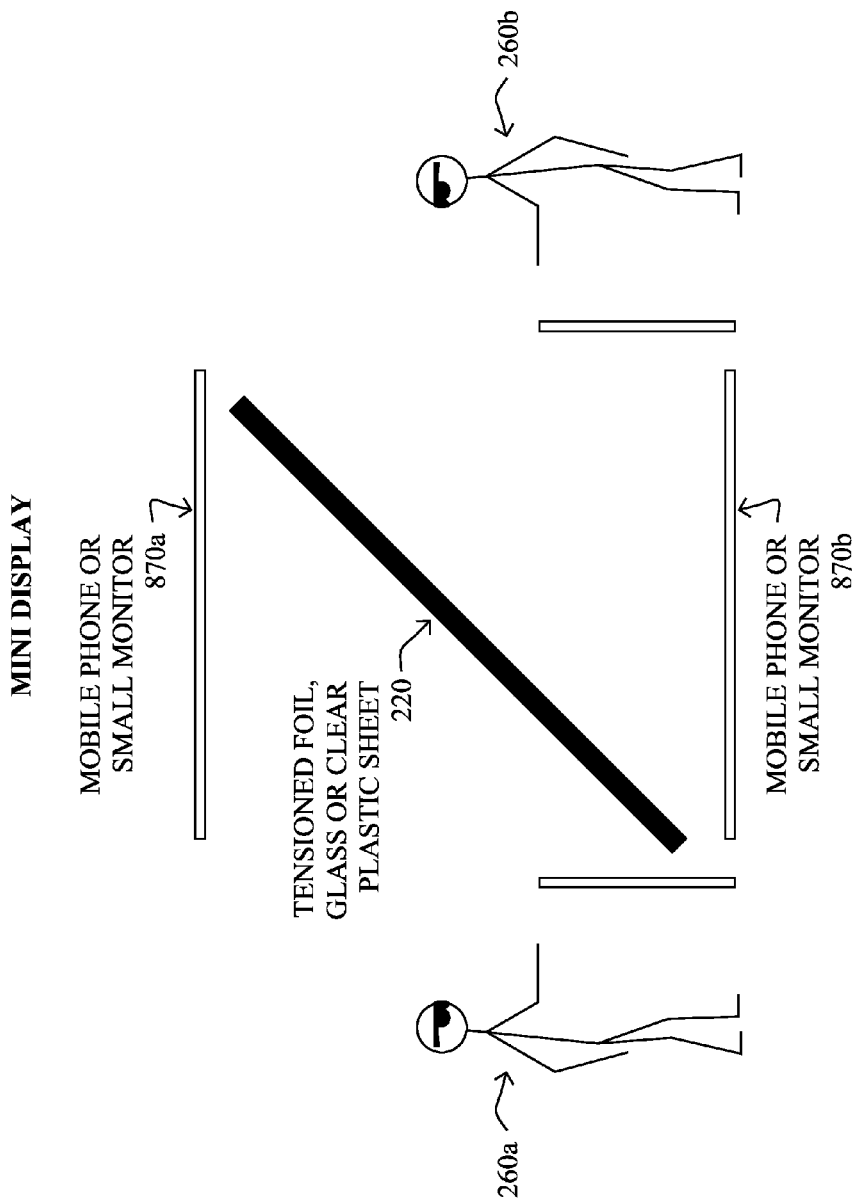
FIG. 8 illustrates another example dual-sided holographic image system using smaller panel displays in accordance with one or more embodiments described herein.

In particular, FIG. 7 illustrates an example where two panel displays 770a and 770b (e.g., LED/LCD/etc.) can be placed on the floor and ceiling of a system, such that a holographic image can be seen from both sides based on the centrally located foil 220 between the viewers 260a and 260b. FIG. 8 is similar to FIG. 7, but smaller panel displays 870a and 870b may be used, such as monitors, tablets, phones, etc.

Figure 9:
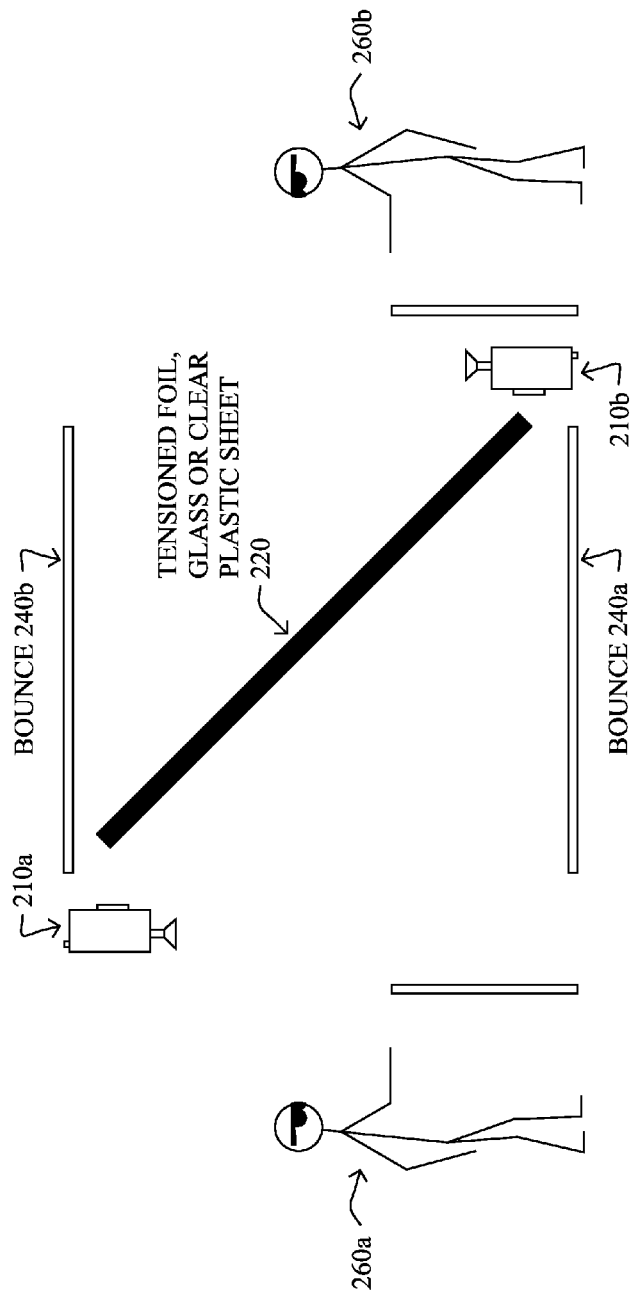
FIG. 9 illustrates an example dual-sided holographic image system using projectors and bounces on the floor and ceiling in accordance with one or more embodiments described herein.
Figure 10:
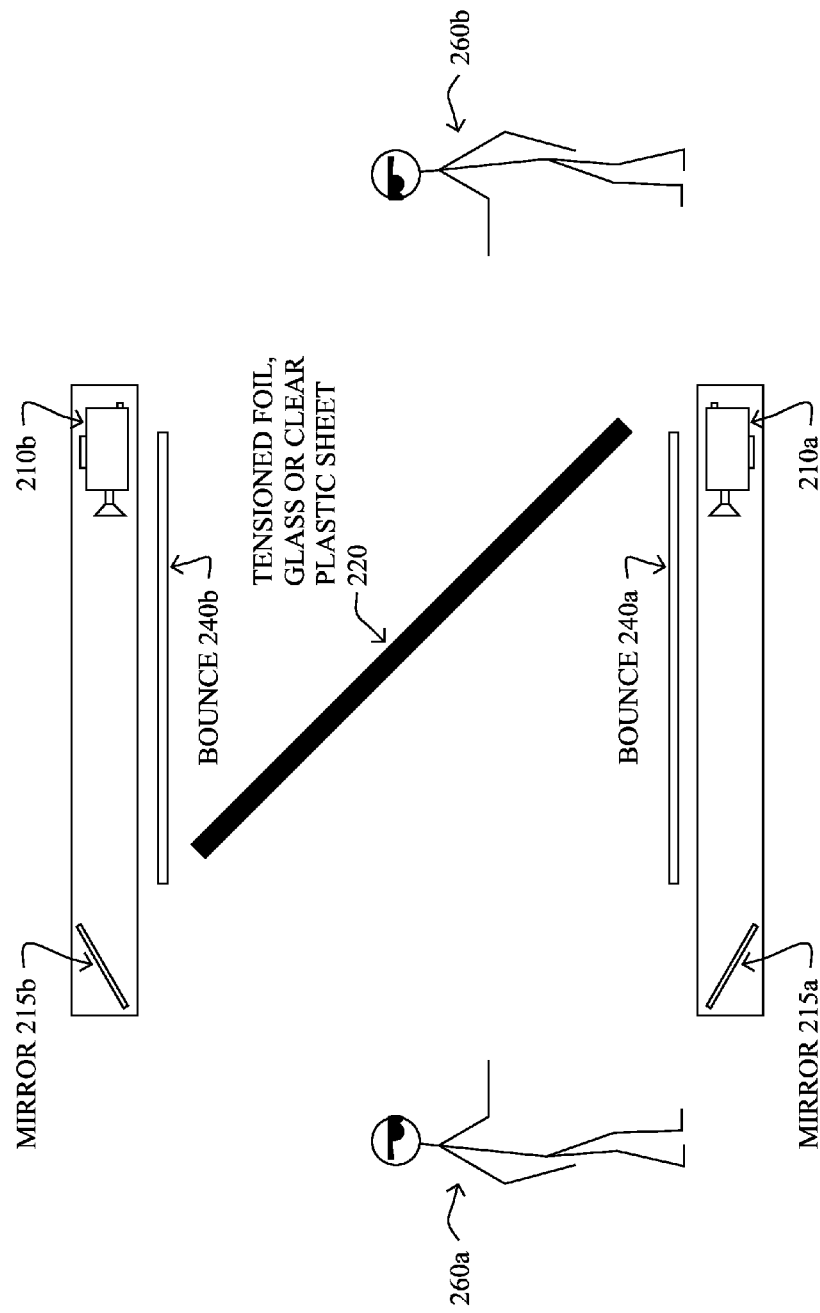
FIG. 10 illustrates another example dual-sided holographic image system using projectors and bounces on the floor and ceiling in an example "low-profile" projection arrangement in accordance with one or more embodiments described herein.

Another way to accomplish this effect is to use two or more projectors and two bounces. For example as shown in FIG. 9, one projector 210a is on the ceiling projecting down onto a bounce 240a on the floor, while another projector 210b is on the floor projecting onto a bounce 240b on the ceiling (note: multiple projectors could be used to increase brightness). Similarly, FIG. 10 illustrates an example "low-profile" projection arrangement, where a mirror (215a and 215b) is used to reflect the image from a projector onto the "back" surface of the bounce 240 (240a and 240b, respectively) (e.g., "rear projection", as will be appreciated by those skilled in the art). Note that the orientation of the projectors 210a and 210b is merely an example in FIG. 10, and though shown on the same side (right), they could, in fact, be on different sides (right and left).

Figure 11:
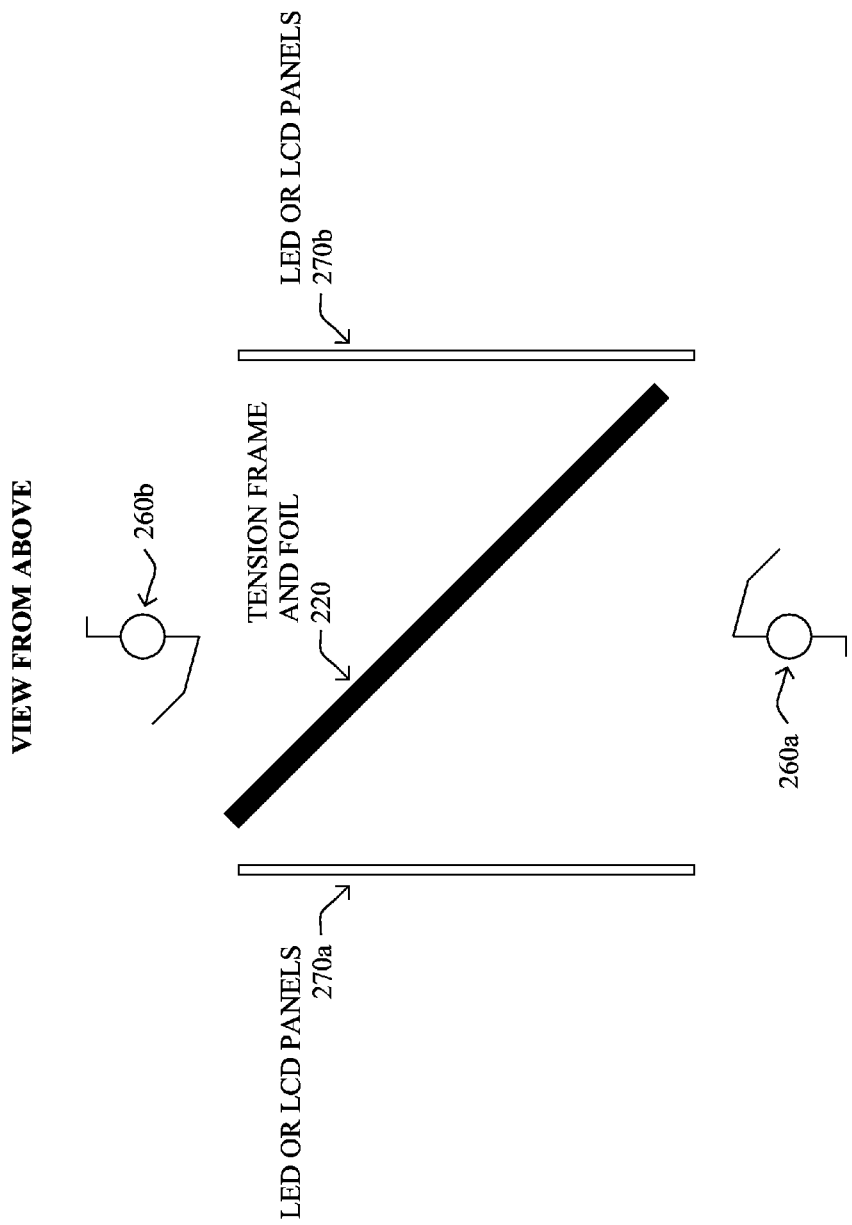
FIG. 11 illustrates another example dual-sided holographic image system using panel displays on the sides in accordance with one or more embodiments described herein.

Note that in still another alternative embodiment, rather than placing the image sources on the floor and ceiling (floor-side and ceiling-side of the holographic screen), it is possible to place them on the sides or walls (wall-sides of the holographic screen), such as illustrated in FIG. 11. In particular, video panels 270a and 270b (which may be large LEDs/LCDs 770 or smaller panels 870) are shown (though projectors could be used) on the sides, with a transparent holographic screen 220 vertically placed in the middle at a 45-degree angle to both light panels.

Figure 12:
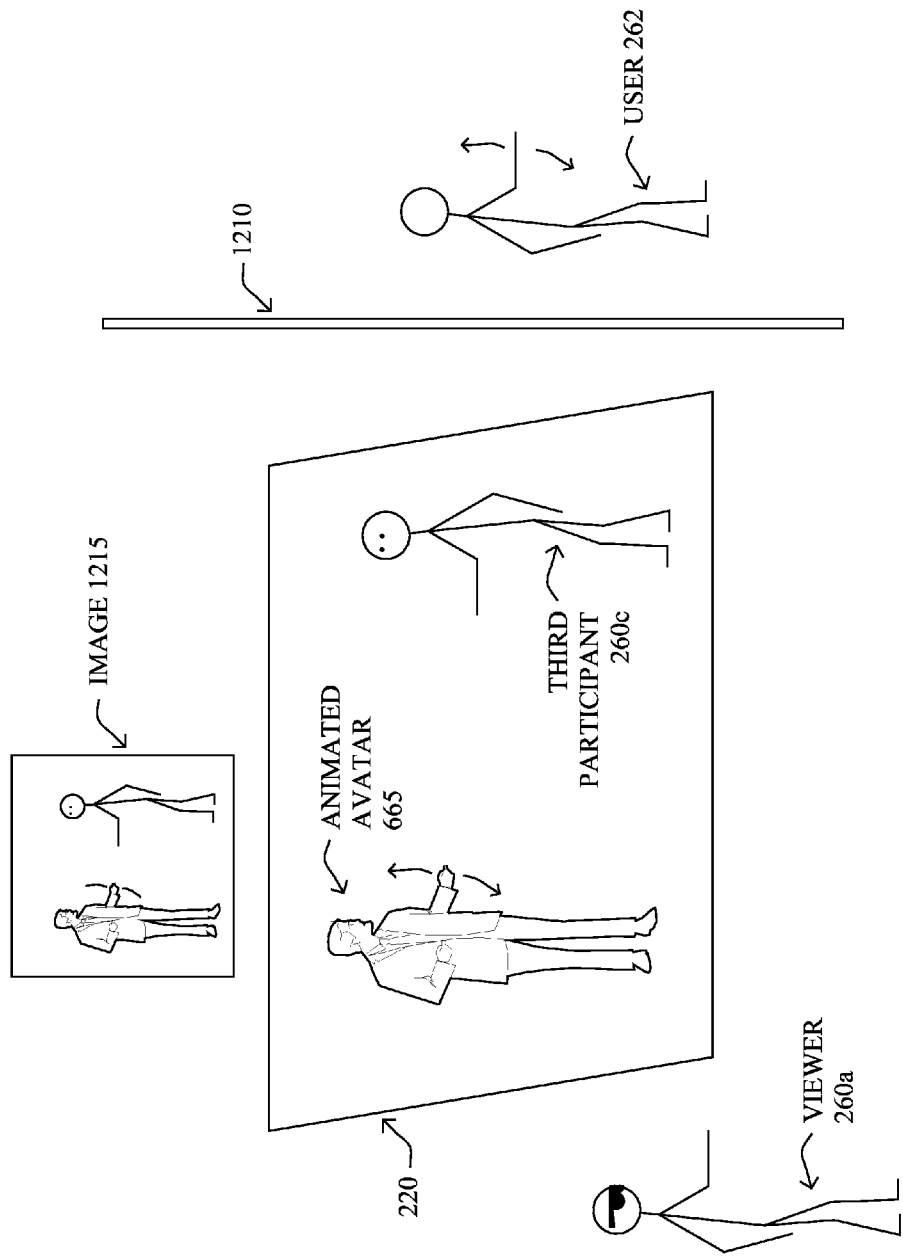
FIG. 12 illustrates an example dual-sided holographic image system used with interactive avatar control in accordance with one or more embodiments described herein.

Based on the above systems and techniques, holographic images can thus be displayed on both sides of a Pepper's Ghost Illusion setup. As such, stage performers or actors can also see what is being projected to an audience, where interaction with images displayed is easier and more effective to the audience. For example, in addition to watching a streamed or pre-recorded holographic image/video, the techniques herein may also be used in conjunction with inter-active holographic avatar control, which allows a person to stand next to a holographic projection of a character (e.g., monster, celebrity, anthropomorphized object, etc.) that may be controlled by a second person and interact with it. For instance, while a viewer could interact with a controlled avatar that may be controlled by a user, either off to the side or in a remote location, as shown in FIG. 12, a third participant 260c may stand behind the holographic projection (e.g., avatar 665), creating the illusion to the viewer 260a that the third participant is physically interacting with the holographic controlled avatar (e.g., controlled by user 262, illustratively though not necessarily behind a wall 1210). The third participant may thus be shown an image 1215 of the avatar as well, i.e., what the viewer sees, in order to allow visual interaction with the avatar (e.g., high-fives, dancing, fighting, etc.).

In addition, the field of view is doubled for audiences generally, such as displaying a holographic image in both directions (e.g., placing the system in the middle of a room or hallway, so the images can be seen from both sides). This may be particularly useful for marketing, presentations, entertainment, etc. For instance, rather than placing a background behind the image, free-standing systems may be used.

Figure 13A:
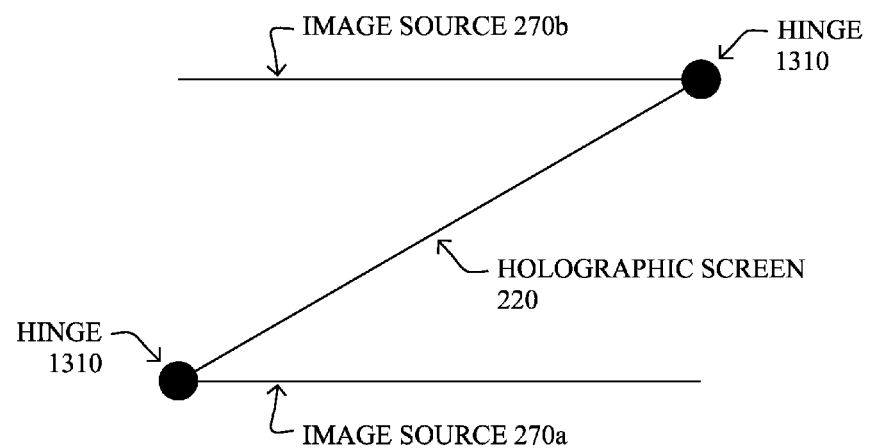
FIGS. 13A-13B illustrate an example Z frame for use with dual-sided holographic image system in accordance with one or more embodiments described herein.
Figure 13B:
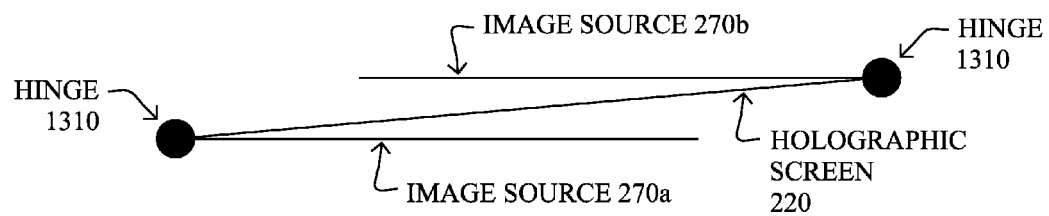

According to one or more additional embodiments of the present invention, the systems above may be established with a specially designed "Z frame" to minimize the look (particularly for smaller displays for retail, etc.) of the system. For instance, as shown in FIGS. 13A-13B, the bottom image source 270a (or first side), holographic foil/frame 220, and top image source 270b (or second side) can be attached only at the corners (hinges 1310), which as shown in FIG. 13A creates a "Z" shape in the open position, which in certain embodiments, may be configured to be folded substantially flat, as shown in FIG. 13B. When designed for smaller systems (e.g., FIG. 8), the Z frame allows for greater portability, and thus may be used as a travel system for dual-sided holographic displays.

Figure 14:
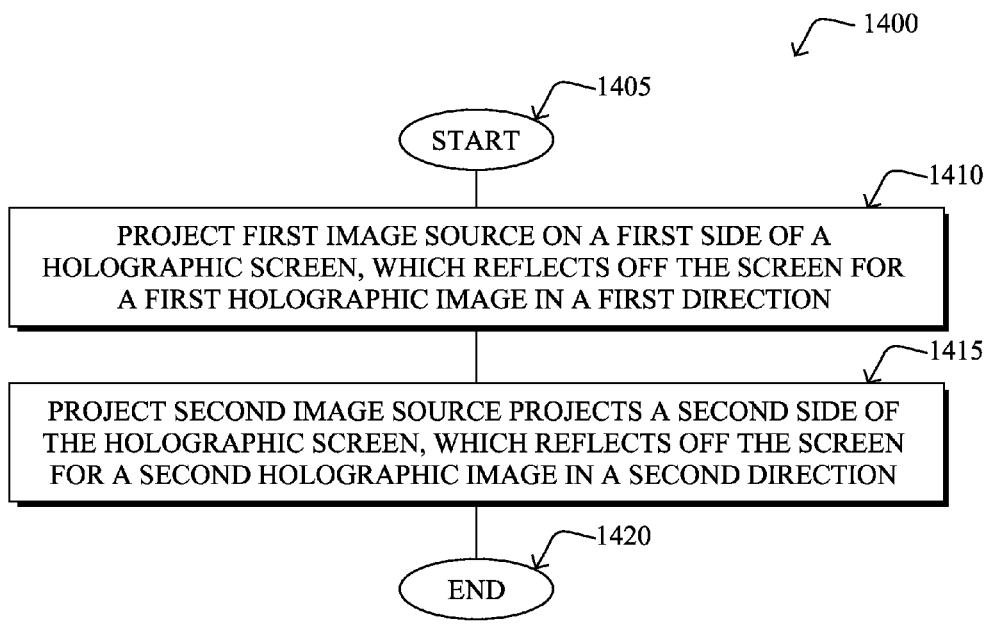
FIG. 14 illustrates an example simplified procedure for using a dual-sided Pepper's Ghost Illusion in accordance with one or more embodiments described herein.

FIG. 14 illustrates an example simplified procedure for using a dual-sided Pepper's Ghost Illusion in accordance with one or more embodiments described herein. The simplified procedure 1400 may start at step 1405, and continues to step 1410, where a first image source projects on a first side of a holographic screen, which reflects off the screen for a first holographic image in a first direction. In step 1415, a second image source projects on a second side of the holographic screen, which reflects off the screen for a second holographic image in a second direction. The simplified procedure ends in step 1420.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for a dual-sided Pepper's Ghost Illusion. In particular, as mentioned above, the techniques described herein allow using multiple image sources (e.g., projected bounces and/or panel displays) so the holographic image can be seen from both sides of the holographic system. For instance, while single-sided systems allow a holographic image to be seen for about a 170-degree viewing angle, using a dual-sided system as described herein, the image can be seen on both sides, increasing the total viewable angle to about 340 degrees. As mentioned above, this arrangement is useful for larger viewing audience angles as well as for holographic interaction, such as for stage performers, avatar interaction, etc. Also, by using a specifically designed "Z frame", the visible components in such a dual-sided system (e.g., particularly for smaller displays) are minimized.

While there have been shown and described illustrative embodiments, it is to be understood that various other adaptations and modifications may be made within the spirit and scope of the embodiments herein. For example, the embodiments described herein may be used with holographic projection images produced from a variety of sources, such as live-streamed, pre-recorded, re-constructed, computer-generated, and so on. Also, any reference to "video" or "image" or "picture" need not limit the embodiments to whether they are motion or time-sequence photography or still images, etc. Moreover, any holographic imagery techniques may be used herein, and the illustrations provided above are merely example embodiments, whether for two-dimensional or three-dimensional holographic images.

Further, the embodiments herein may generally be performed in connection with one or more computing devices (e.g., personal computers, laptops, servers, specifically configured computers, cloud-based computing devices, cameras, etc.), which may be interconnected via various local and/or network connections. Various actions described herein may be related specifically to one or more of the devices, though any reference to particular type of device herein is not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
projecting a first image from a first image source onto a first side of a holographic screen, wherein the first image reflects off the first side of the holographic screen for a first holographic image in a first direction; and
projecting a second image from a second image source onto a second side of the holographic screen, wherein the second image reflects off the second side of the holographic screen for a second holographic image in a second direction, wherein the first and second images produce a same holographic image in the first and second directions, respectively.

2. The method as in claim 1, wherein the first and second image sources are located at a floor-side and ceiling-side of the holographic screen, respectively.

3. The method as in claim 1, wherein the first and second image sources are located at a respective wall-side of the holographic screen.

4. The method as in claim 1, wherein at least one of the first and second image sources is a video panel.

5. The method as in claim 1, wherein at least one of the first and second image sources is a video projection system.

6. The method as in claim 1, wherein at least one of the first and second image sources is at an approximately 45-degree angle to the holographic screen.

7. The method as in claim 1, wherein the first and second sides of the holographic screen comprise separate first and second holographic screens, respectively.

8. The method as in claim 1, wherein the first and second are projected by flat panel displays fold out from them holographic screen.

9. A system, comprising:
a holographic screen;
a first image source configured to project a first image onto a first side of the holographic screen, wherein the first image reflects off the first side of the holographic screen for a first holographic image in a first direction; and
a second image source configured to project a second image onto a second side of the holographic screen, wherein the second image reflects off the second side of the holographic screen for a second holographic image in a second direction, wherein the first and second image sources are rotatably attached to the holographic screen.

10. The system as in claim 9, wherein the first and second image sources are located at a floor-side and ceiling-side of the holographic screen, respectively.

11. The system as in claim 9, wherein the first and second image sources are located at a respective wall-side of the holographic screen.

12. The system as in claim 9, wherein at least one of the first and second image sources is a video panel.

13. The system as in claim 9, wherein at least one of the first and second image sources is a video projection system.

14. The system as in claim 9, wherein at least one of the first and second image sources is at an approximately 45-degree angle to the holographic screen.

15. The system as in claim 9, wherein the first and second sides of the holographic screen comprise separate first and second holographic screens, respectively.

16. The system as in claim 9, wherein at least one of the first and second image sources fold out from the holographic screen to form a Z-frame.

17. The system as in claim 9, further comprising:
a first hinge attaching the first image source to a first end of the holographic screen; and
a second hinge attaching the second image source to a second end of the holographic screen;
wherein the first image source, second image source, and holographic screen are configured to fold to a substantially flattened shape.

18. An apparatus, comprising:
a holographic screen;
a first image source configured to project a first image onto a first side of the holographic screen, wherein the first image reflects off the first side of the holographic screen for a first holographic image in a first direction; and
a second image source configured to project a second image onto a second side of the holographic screen, wherein the second image reflects off the second side of the holographic screen for a second holographic image in a second direction, wherein the first and second images produce a same holographic image in the first and second directions, respectively.

19. The apparatus as in claim 18, wherein at least one of the first and second image sources is a video panel.

20. The apparatus as in claim 18, further comprising:
a first hinge attaching the first image source to a first end of the holographic screen; and
a second hinge attaching the second image source to a second end of the holographic screen;
wherein the first image source, second image source, and holographic screen are configured to fold to a substantially flattened shape.

* * * * *